Patented Aug. 1, 1939

2,168,212

UNITED STATES PATENT OFFICE 2,168,212

SYNTHETIC METALLIC ENAMEL

Glenn H. Hicks, Detroit, Mich., assignor to Acme White Lead & Color Works, Detroit, Mich., a corporation of Michigan No Drawing. Application August 17, 1938, Serial No. 225,347

4 Claims. (Cl. 260—39)

This invention relates to baking synthetic metallic enamels and has for its primary object the provision of an enamel of this type which will be especially adapted for use on automobiles and not only produce a thoroughly uniform and attractive finish, but be adapted for use on the regular production lines in the automobile factories along with ordinary baking synthetic enamels for producing other types of finish.

Metallic lacquer finishes have been used for a number of years by automobile manufacturers, and this type of finish has gained wide popularity, but is relatively expensive because of the necessity for rubbing the finish to produce a high gloss. Automobile manufacturers who have continued to use ordinary lacquer finishes on their production lines have not experienced any substantial difficulties in the use of metallic lacquer finishes, but the present trend in automobile finishes is to the baked synthetic enamel type because of the economy involved in its application, due to the fact that fewer coats are required, also because of better weathering properties, and the avoidance of the rubbing operations which are necessary in the lacquer finishes.

Heretofore there have been attempts to produce baking synthetic metallic finishes which would compare favorably with the rubbed metallic lacquer finish in appearance, but these attempts have not produced satisfactory results because of the tendency of the material to "flood", with a resulting non-uniformity in the appearance of the finish on different parts of the automobile body.

Automobile manufacturers who have been using ordinary baking synthetic enamels have been handicapped in producing metallic finishes because there has heretofore been no satisfactory synthetic metallic finish available and it has, therefore, been necessary for such manufacturers to meet the demand for metallic finishes by using metallic lacquer finishes which could not be applied in the regular production lines and, therefore, the automobiles that were provided with the metallic lacquer finishes had to be finished as special jobs.

I have discovered that a highly satisfactory baking synthetic metallic enamel can be produced by employing, as the synthetic resins in the material, a combination of alkyd resins and urea formaldehyde, and I give below a typical formula for a material of this kind, the percentages stated being by weight:

| | |
|---|---|
| Titanium di-oxide—low oil absorption | .2247 |
| Aluminum stearate | .001 |
| Antimony oxide | .2544 |
| Monastral blue | .1555 |
| Lamp black | .1950 |
| Aluminum bronze | .9624 |
| Inert pigment | .9624 |
| Alkyd varnish | 55.3966 |
| Urea formaldehyde | 25.2124 |
| Volatile solvents | 16.1598 |
| Metallic driers | .4749 |

In this formula the various materials specified may be classified as follows:

Pigments:

| | |
|---|---|
| Titanium dioxide—low oil absorption | .2247 |
| Antimony oxide | .2544 |
| Monastral blue | .1555 |
| Lamp black | .1950 |

Inert:

| | |
|---|---|
| Calcium carbonate | .9624 |

Metal:

| | |
|---|---|
| Aluminum bronze | .9624 |

Synthetic resins:

| | |
|---|---|
| Alkyd varnish (non-volatile) | 27.6983 |
| Urea formaldehyde (non-volatile) | 12.6062 |

Metallic driers:

| | |
|---|---|
| Manganese naphthanate | .4749 |

Volatile solvents:

| | |
|---|---|
| Hi flash solvent naphtha | 1.9731 |
| Turpentine | 7.7310 |
| Mineral spirits | 6.6011 |
| Xylol | 17.5540 |
| VM & P naphtha | 6.6651 |
| Hydrosolvent #2 | 8.0210 |
| Butyl alcohol | 7.9200 |
| | 99.9991 |

The metal used in this formula is aluminum powder and is introduced as a paste which has been ground on a burr stone mill or other paint grinding equipment. In preparing this paste the following formula was used:

| | Pounds |
|---|---|
| Aluminum bronze | 21 |
| Inert (calcium carbonate) | 21 |
| Alkyd resin solution (53.5% volatile solvents by weight) | 45 |
| Turpentine | 13 |
| | 100 |

The use of an inert pigment is not essential in preparing the paste but it does have the advantage of lessening the grinding time. While I use calcium carbonate as the inert, other inerts, such as barytes, blanc fixe, china clay, asbestine, etc., could have been used with equally satisfactory results.

The aluminum stearate comes into the formula through its use with the pigments, when they are ground, to help prevent the pigments from settling to a hard mass in the finished enamel when the latter is allowed to stand over a period of time without movement or agitation. In this particular formula the aluminum stearate was used only with the titanium oxide and was ground therewith over a roller mill in accordance with the following formula:

| | Pounds |
|---|---|
| Titanium oxide | 239 |
| Aluminum stearate | 1 |
| Alkyd resin solution containing 55% volatile solvents by weight | 292 |

The bronze powder should be ground to an extremely fine state but, as introduced into the formula, does not have to be of the non-leafing type. However, it is necessary that the bronze powder be either ground in or allowed to stand in contact with all or a portion of the vehicle of the formula so as to become thoroughly wet and dispersed, and thereby destroy the leafing properties of the powder. Instead of introducing the bronze powder in the form of a paste prepared as above specified, it may also be added as a paste ground or wet with volatile solvents, or even as dry powder. In case it is added as a dry powder it should be stirred well with part or all of the balance of the enamel and allowed to stand or be agitated until the powder becomes wet, so that when the enamel is applied the metal will not have any tendency to "leaf" or "flood" to the surface, but remain dispersed in the film much like the pigments which the enamel contains.

The volatile solvents are so chosen as to promote the best flow, ease of spraying, desired gloss, suitable evaporation rate and solubility for the resins used. This volatile composition may be varied within fairly wide limits as in the preparation of ordinary synthetic enamels. While I have specified certain pigments in the foregoing formula it will be understood that other pigments may be used in lieu thereof to produce enamels of different colors.

The alkyd varnish is used because it possesses compatibility with the urea formaldehyde varnish and gives to the product suitable durability. Other types of alkyd resins may be used with equally good results. Urea formaldehyde is used for a two-fold purpose, and is actually responsible for the success of the formula. Ordinary synthetic baking enamels, such as are being used on motor cars today, are thermo plastic, so that when an automobile body, having been painted with the enamel, emerges from an oven having a temperature of 250° F., or thereabouts, the film is exceptionally soft and does not become thoroughly hard until the surface has cooled to room temperature. In the case of metallic enamel which I have described above, the urea formaldehyde content has a high viscosity to begin with and, upon application, and during the drying steps, the viscosity is further increased to a point that holds in uniform suspension the various pigments and metals contained therein. Also during the process of baking, the film is not softened, but becomes harder, thus further aiding in holding the pigments intact and preventing off-color flooding spots or shadows.

Air drying synthetic metallic finishes have been used for some time but, when attempts were made to bake these finishes, before the finish had become dry the heat produced a softening and lowering of the viscosity of the finish to such an extent that, while the finish had apparently ceased flowing before being baked, it continued flowing, or started flowing again in the oven, thereby producing an uneven color or cloudy effect. This effect is very noticeable when the finish is not applied in the same film thickness over the entire surface being finished, there being a noticeable difference in color between areas of varying film thickness. By the use of urea formaldehyde resin this tendency to show variations of color due to variations in film thickness, when the film is baked, is reduced to the point where it becomes practicable. The urea formaldehyde instead of "re-flowing" in the baking oven, or becoming less viscous, has a tendency to lose its volatile solvents rapidly, thereby hastening the hardening of the finish, so that the "flooding" tendency is minimized. The baking synthetic metallic enamel made in accordance with the foregoing formula has been used with marked success in the finishing of automobiles, according to the following procedure:

The composition, as above formulated, was reduced about 25% with hydrogenated naphtha to a viscosity of 20 to 21 seconds in the Ford #4 viscosity cup at 80° F., that is to 100 parts by volume there were added 25 parts by volume of the hydrogenated naphtha, which produced a material that was well adapted for spraying. This reduced material was placed in a pressure tank maintaining a pressure on the material of from 10 to 12 pounds per square inch. The spray gun used was a DeVilbiss MBC gun with a #76 head and an AV–601–FX tip. The air pressure in the gun was maintained at from 90 to 110 pounds per square inch. Two coats were applied in the same manner that ordinary synthetic baking enamels are applied, allowing two to three minutes between coats, and within two minutes after the application of the final coat the coated automobile body was placed in the oven for one hour, at 250° F. While this composition can be air dried or baked, it is preferable to employ the baking step so as to produce a finish having satisfactory durability. A wide variation of baking schedules can be used between the air drying at ordinary temperatures and one hour at 250°–300° F.

The amount of urea formaldehyde used in the formula can be varied within wide limits, but the use of this material is necessary to get the desired results. It may constitute as much as 100% of the synthetic resins used, but this eliminates the alkyd resin, and when used in this manner the volatile content of the composition must be changed considerably to minimize the high viscosity of the urea formaldehyde solution. Even with the volatile composition radically changed from that shown in the formula given above, an enamel having 100% urea formaldehyde would have to be reduced for spraying considerably further than one having 69% alkyd varnish and 31% urea formaldehyde as its non-volatile vehicle content. Radically changing the volatile content so as to minimize the high viscosity of the urea formaldehyde is costly. If this is not done it is necessary to reduce the enamel for spray application so far that the proper film thickness per coat is not obtained. Generally speaking, when the urea formaldehyde is varied from 20 to 45% of the non-volatile vehicle satisfactory non-flooding consistent with good flow, satisfactory film thickness, ease of spraying, satisfactory material cost, and good gloss are obtained.

A variation in the amount of urea formaldehyde requires a corresponding variation in the amount of alkyd resin. Even 90% alkyd resin varnish and 10% urea formaldehyde when used as the solid resin content in a formula similar to that given above exhibits a marked improvement in non-flooding over the enamel containing 100% alkyd resin varnish as the resin content. When the urea formaldehyde is used in the vehicle solids content in amounts as low as 10% it is generally advisable to then so choose the volatile constituents as to have a more volatile or faster evaporating composition than that produced by the formula given above, and then reduce, for spraying, with a reducer considerably faster evaporating than the hydrogenated naphtha. Naturally when the evaporation rate of the solvents is faster than that given in the example, and the evaporation rate of the reducer used for spraying is faster than that used in the example, flow is impaired and it is difficult to obtain a satisfactory appearance on the sprayed surface because of this.

While I have described the essential features of my invention and set forth in detail a workable formula for practicing the same, it is to be understood that the invention is not limited to the particular formula given, but the various constituents may be changed within fairly wide limits as I have indicated and, therefore, I claim as my invention all variations of the composition that come within the scope of the appended claims.

Having thus described my invention, I claim:

1. A baking synthetic metallic enamel composed of a mixture of finely ground metal bronze powder, other pigment material, volatile solvents and synthetic resins being in situ, and said synthetic resins consisting of alkyd resin and urea formaldehyde resin that is compatible with the alkyd resin and has the property of becoming more viscous on the application of heat, said urea resin being from 10% to 90% by weight of the total amount of said resins.

2. A baking synthetic metallic enamel composed of a mixture of finely ground metal bronze powder, other pigment material, volatile solvents and synthetic resins being in situ, and said synthetic resins consisting of alkyd resin and urea formaldehyde that is compatible with the alkyd resin and has the property of becoming more viscous upon the application of heat and of which the urea formaldehyde is from 20% to 45% by weight of the total amount of said resins.

3. A baking synthetic metallic enamel composed of a mixture of the following materials in substantially the proportions specified by weight, viz: non-leafing metal bronze powder 1%, alkyd resin 27–28%, urea formaldehyde in situ 12–13% which is compatible with the alkyd resin and has the property of becoming more viscous upon the application of heat, volatile solvents 56%, metallic drier ½%, and the balance other pigment materials.

4. A baking synthetic metallic enamel as defined in claim 1 and adapted for application by spraying by the addition thereto of a quantity of hydrogenated naphtha which is substantially 25% of the volume thereof.

GLENN H. HICKS.